US005766653A

United States Patent [19]

Wiggs et al.

[11] Patent Number: 5,766,653

[45] Date of Patent: Jun. 16, 1998

[54] APPARATUS FOR FORMING MALLEABLE MATERIAL

[75] Inventors: Christopher Charles Wiggs; Christopher Joseph Crabtree Taylor, both of London, England

[73] Assignee: Origin Products Ltd., London, England

[21] Appl. No.: 550,885

[22] Filed: Oct. 31, 1995

[30] Foreign Application Priority Data

Nov. 3, 1994 [GB] United Kingdom .................... 9422192

[51] Int. Cl.[6] .................................................. B29C 43/36

[52] U.S. Cl. ............................ 425/318; 425/408; 425/409

[58] Field of Search .................................... 425/318, 400, 425/408, 409, DIG. 57

[56] References Cited

U.S. PATENT DOCUMENTS

| | | | |
|---|---|---|---|
| 976,530 | 11/1910 | Williams | 425/318 |
| 1,584,757 | 5/1926 | Dow | 425/318 |
| 2,542,556 | 2/1951 | Morin | 425/408 |
| 2,954,597 | 10/1960 | McFarland | 425/DIG. 57 |
| 2,964,791 | 12/1960 | McFarland | 425/DIG. 57 |
| 3,741,706 | 6/1973 | Conley et al. | 425/409 |

FOREIGN PATENT DOCUMENTS

| | | | |
|---|---|---|---|
| 387306 | 12/1923 | Germany | 425/408 |

*Primary Examiner*—Robert Davis

*Attorney, Agent, or Firm*—Woodard, Emhardt, Naughton, Moriarty & McNett

[57] ABSTRACT

The invention which is the subject of this application relates to apparatus for use in forming a malleable material such as, but not exclusively, modelling clay into a desired shape. The apparatus is provided for the reception of mold pieces therein which determine the shape of the malleable material and said mold pieces are arranged to be brought together to press the malleable material placed between the same into the required shape. The apparatus further includes a member which serves to locate and support the malleable material in the form of the shaped article in a fixed position at least at the instant when the mold pieces are moved apart thereby ensuring that the malleable material is not damaged by the removal of the mold pieces and is not required to be handled or held while the mold pieces are moved apart. This therefore minimizes the damage to the article formed.

17 Claims, 7 Drawing Sheets

APPARATUS FOR FORMING MALLEABLE MATERIAL

The invention which is the subject of this patent application is apparatus for use in forming a malleable material such as, but not exclusively, modelling clay into a desired shape. The shape formed is determined by the mould pieces used in conjunction with the apparatus.

Malleable materials such as modelling clays are used extensively in many areas such as in the arts and crafts area and also as playthings. When used as a plaything the material can be used with forming apparatus. One type of apparatus utilises the possibility of extruding the material and provides means whereby the material can be extruded through shaped apertures. One relatively unusual form of extrusion apparatus is disclosed in U.S. Pat. No. 3,685,936. Although little used this apparatus extrudes the material into a mould to form the same into the shape of the mould.

Another type of forming apparatus presses the malleable material into moulds to form shapes therein. It is this form of apparatus with which the current invention is particularly concerned. In one known form the malleable material is pressed onto a single mould to form an impression and shape on one side of the malleable material. Again the shapes which can be created are limited and, furthermore, are limited to being formed on only one side of the material. It is known that malleable material can be pressed between two mould pieces to form a shaped article. However, when the two mould pieces are used and then moved apart the malleable material tends to be retained by one or both of the mould pieces.

Hence the material must be removed by hand or implement and this removal causes the shaped article formed to be damaged or even destroyed. Thus, double mould pieces cannot reliably or conveniently be used directly on malleable material. As a means of overcoming this problem U.S. Pat. No. 3,552,711 shows a form of press apparatus which is used for forming a malleable material wherein the malleable material is required to be held within a tinfoil outer coating to allow the same to be used. This device, which is typically used for forming tin foil covered chocolate coins, has the advantage that the malleable material is not in direct contact with the mould pieces and thus the formed article can be easily removed from the mould pieces. However, when a press is used with the mould pieces in direct contact with the malleable material the material tends to be retained by the mould pieces when attempts are made to remove the same after forming. Thus the patterns and/or shapes formed in the malleable material can be destroyed by part of the malleable material being retained by the mould pieces or the use of fingers or implements to remove the malleable material from the mould pieces.

Thus no conventional press forming apparatus is known which can be used in direct contact with malleable material to form the same into shapes or form patterns therein and then provide means to cause the removal of the malleable material from the mould pieces.

The aim of the present invention is to provide apparatus for forming malleable material into a desired form and shape which can be relatively complex and which allows the malleable material to be prevented from being retained by the mould pieces upon removal of the same and allows the shaped article to be removed from the apparatus with minimal or no damage being caused.

Apparatus for use to form a malleable material into a shaped article, said apparatus including at least two mould pieces positioned on a mechanical arrangement which is actuable by hand to move the mould pieces into a position to contact with and form malleable material into the shaped article defined by the mould pieces, and apart to release, and allow removal of, the shaped article, and wherein the apparatus includes a member to locate said malleable material in the form of the shaped article in a fixed position at least at the instant of moving the mould pieces apart and said member passes at least partially into the malleable material.

The provision of the location member therefore allows the malleable material to be extracted from the mould pieces at the instant of relative movement between the location member and the mould pieces, and typically the malleable material is pressed down onto the location member prior to actuating the mechanical arrangement to bring the mould pieces into contact with the malleable material.

Typically the location member passes at least partially into the malleable material to form a blind port.

In one embodiment the location member passes through the malleable material to form a channel there through. Preferably the location of the port formed in relation to the malleable material and the mould pieces is such as to minimise the impact on the physical appearance of the shaped article.

In one embodiment the location member is provided in a fixed position relative to the mould pieces as they are moved.

In a second embodiment the location member is provided to be movable in a direction perpendicular to the longitudinal axis of the same. In this embodiment the location member is retracted from the malleable material once the mould pieces are moved apart such that the shaped article is free to be removed from the apparatus, so that the support member is movable, as the mould pieces are moved, between a position where substantially all of the member is within the malleable material and a position where substantially all of the member is retracted from the malleable material.

Typically the location member is retracted from the malleable material once the mould pieces have moved away from the malleable material such that the shaped article which is formed from the malleable material can be removed from the apparatus and preferably the location member is maintained in a stationery position while the mould pieces are moved from the malleable material to an intermediate, apart, position and continued movement of the mould pieces causes the member to move to retract from the malleable material.

In a preferred embodiment the location member is a pin and said pin is typically manufactured from steel and mounted for movement in a plane, typically vertical, intermediate the levers of the mechanical arrangement.

The mechanical arrangement, in one embodiment, comprises two levers mounted to be pivotally movable to and from a common plane, typically vertical, intermediate the two lever pivot points. Preferably said levers are mechanically connected by means of meshed teeth to be movable in a synchronised manner and in symmetrical paths towards and away from the plane.

Preferably each lever is provided with a support surface contact which is brought into contact with a support surface and allows hand actuation of at least one other part of each of the levers to move the mould pieces towards and away from each other.

Typically each lever is provided with a releasable means for locating and securing a mould piece in position on the lever.

Preferably each of said means are arranged at the same position on each lever to ensure that the mould pieces are matchingly brought together to form the malleable material.

The location member is located on the said plane and the member is arranged to be located between the mould pieces when the same are brought together. In one embodiment a third mould piece is provided, typically on the base of the apparatus and the location member passes there through.

When the location member is capable of movement in a plane perpendicular to its longitudinal axis, a pin retractor plate is connected to an end thereof and said retractor plate is movably linked to each of the levers. Typically pins or protrusions on the levers engage with at least one path on the retractor plate such that movement of the levers causes relative movement of the retractor plate and hence location member.

The mould pieces are preferably in the form of a base plate which is a standard size to ensure accurate location on the levers and, upstanding from a portion of said base plate is a mould into which the malleable material is pressed by actuation of the mechanical arrangement. In one embodiment each mould piece used to form a shaped article has location means formed thereon which matchingly engage with location means on another mould piece in the set for a particular article to ensure that the mould pieces are brought together in register.

In a further aspect of the invention there is provided a method of forming a portion of the malleable material into a shaped article comprising the steps of, selecting a set of mould pieces required to form the shaped article, inserting the mould pieces into position on the forming apparatus, moving the levers of the mechanical arrangement of the forming apparatus to a start position by hand, selecting a portion of malleable material, placing the malleable material onto a member provided as part of the forming apparatus, moving the levers by hand to bring the mould pieces into engagement and register, applying further pressure on the levers by hand to exert a pressing force on the malleable material via the mould pieces, moving the levers apart by hand with the malleable material remaining on the member; removing the now shaped malleable material article from the member.

In one preferred embodiment the location member is movable and linked to movement of the levers such that when the levers are moved apart from a mould piece engaging position to an intermediate part position the member remains stationary whereas continued moving apart of the levers from the intermediate position to a fully extended position causes the location member to retract from the shaped article to a position wherein the location member is substantially retracted from the article at which point the article can be removed from the apparatus.

In one embodiment of the invention the malleable material used is a bakable modelling clay and, once removed from the apparatus, the shaped article is placed in an oven and baked to harden the same. Once the article is baked any flash or excess material surrounding the same is removed and the article is used for ornament, decoration and, if the location member has passed through the article the same can be threaded to create, for example, a bracelet or necklace of the articles.

A specific embodiment of the invention is now herein described with reference to the accompanying drawings wherein.

Figure 1:
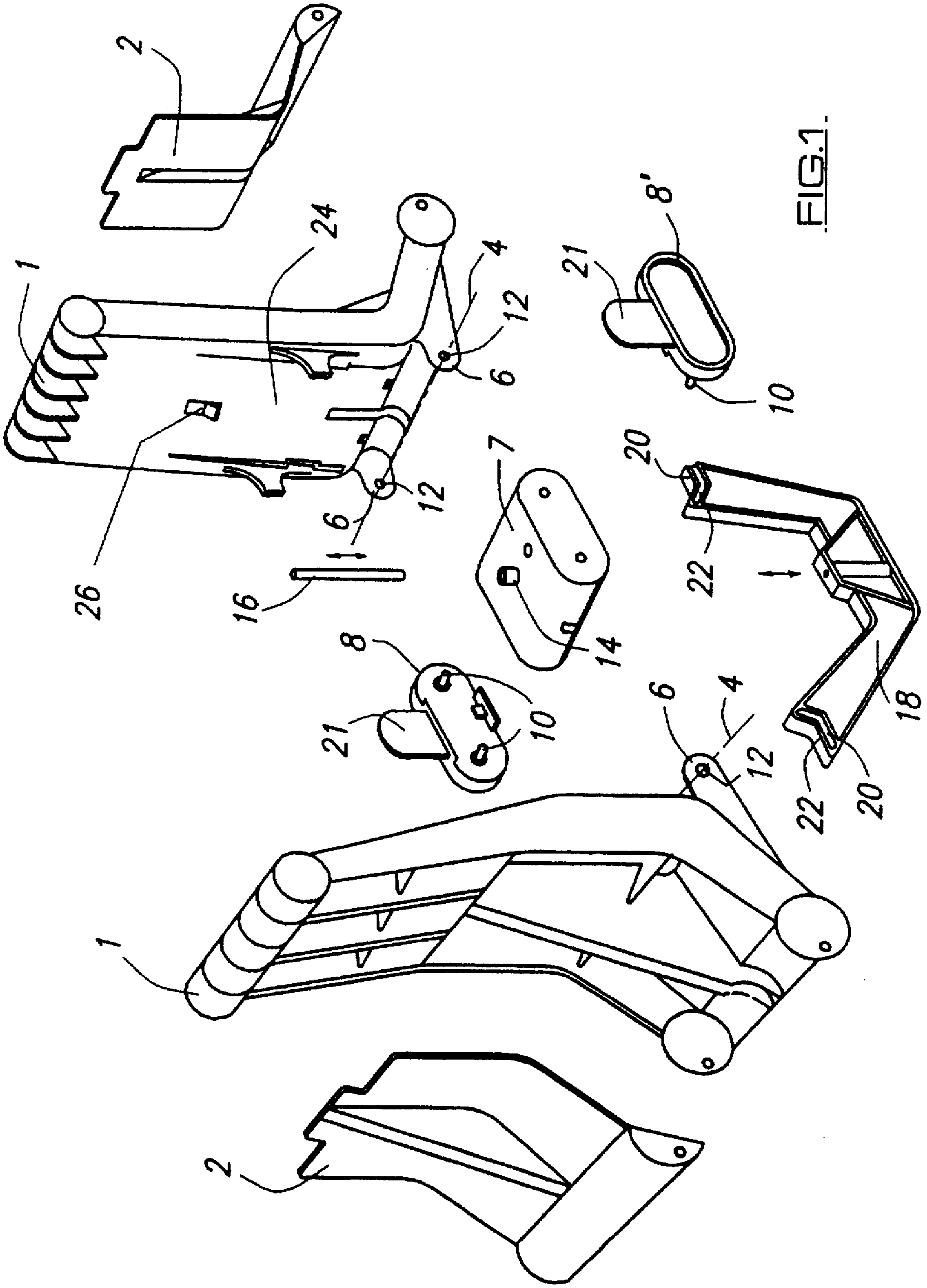
FIG. 1 illustrates a perspective view of the components of the apparatus.

Referring firstly to FIG. 1 the components are shown, which, in combination, form the forming apparatus of the invention in one embodiment. The components comprise two levers 1 each of which is provided with a cover panel 2. Each of the levers are provided with apertures 12 to allow the same to be engaged with and pivotally movable about axes 4,4' around which each respective lever can be moved to a limited extent. At a point adjacent the aperture 12 the outer edges 6 of each lever are formed with gear teeth. The levers 1 are mounted for movement around the pivotal axes 4,4' and are attached to a static plate 7 to which, at each end are attached pivot plates 8,8'. Each pivot plate has two pins 10, each pin passing through one of the apertures 12 in the levers 1 and into the static plate 7 to locate the levers for movement around the static plate. When the levers are held in position relative to the static plate 7, the gear teeth formed on the outer edges 6 of respective and adjacent levers mesh.

The static plate 7 is also provided with an aperture 14 through which a location member 16 which, in this case is in the form of a pin, passes. The base of the location member 16 is engaged to a retractor plate 18. The retractor plate and location member are arranged for movement in a vertical direction relative to the static plate 7 and this movement is controlled by actuation of the levers 1. The retractor plate is provided with two upwardly extending arms 20 and at each end of the arm there are formed paths 22, the operation of which are described in more detail later.

The pivot plates 8 are provided with safety plates 21 to prevent the user of the apparatus from causing personal injury by falling on or inadvertently pressing down onto the location member 16.

Finally, each of the levers 1 includes an area 24 into which a mould piece can be located. Adjacent the said area there is provided a release location means 26 which allows secure location of the mould pieces in position on the lever.

Figure 2:
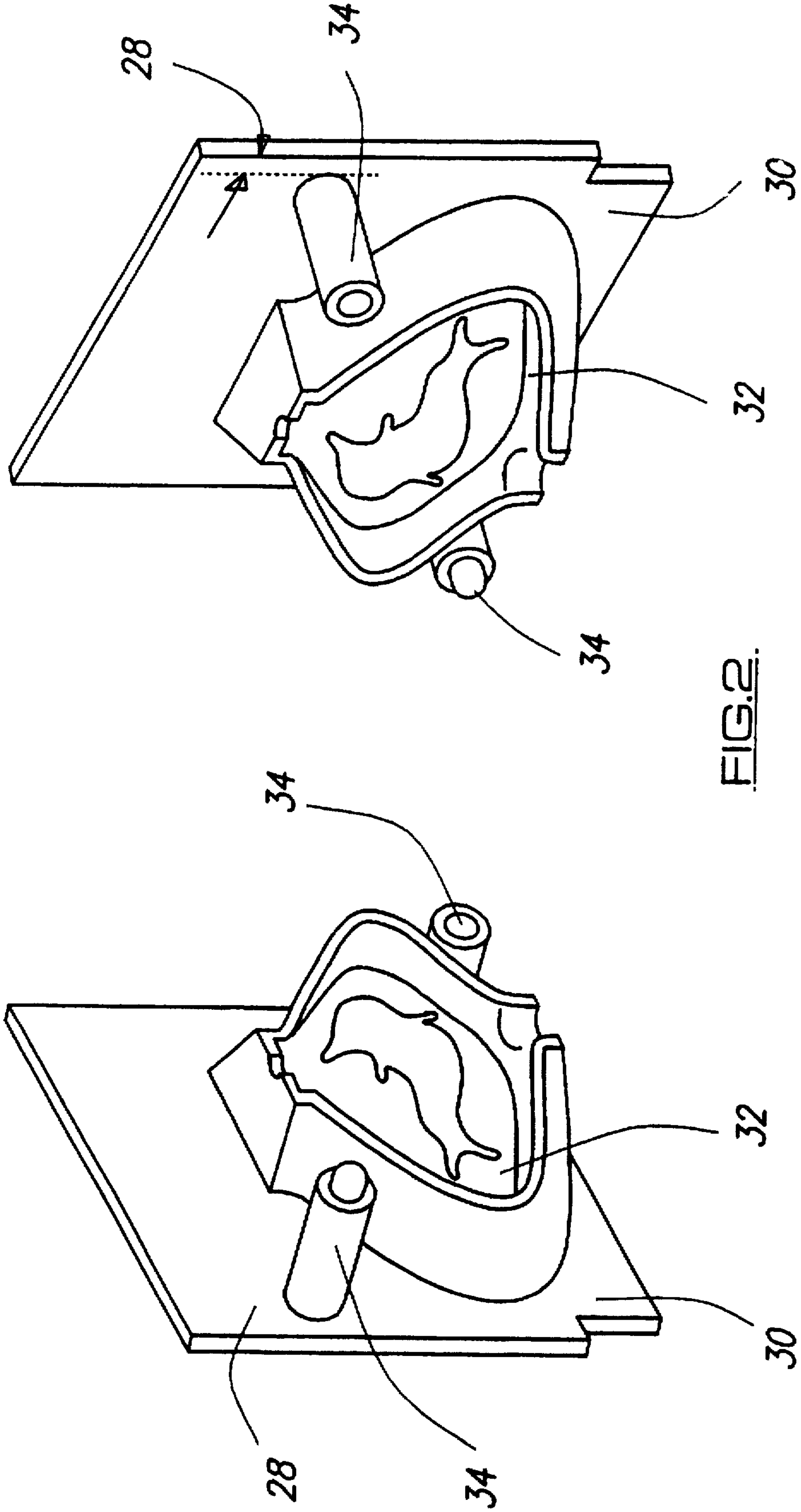
FIG. 2 illustrates mould pieces of the invention.

A pair of mould pieces 28 are shown in detail in FIG. 2. Each mould piece comprises a base plate 30, an upstanding mould portion 32 and location means 34 which ensure that the two mould pieces engage in register.

Figure 3:
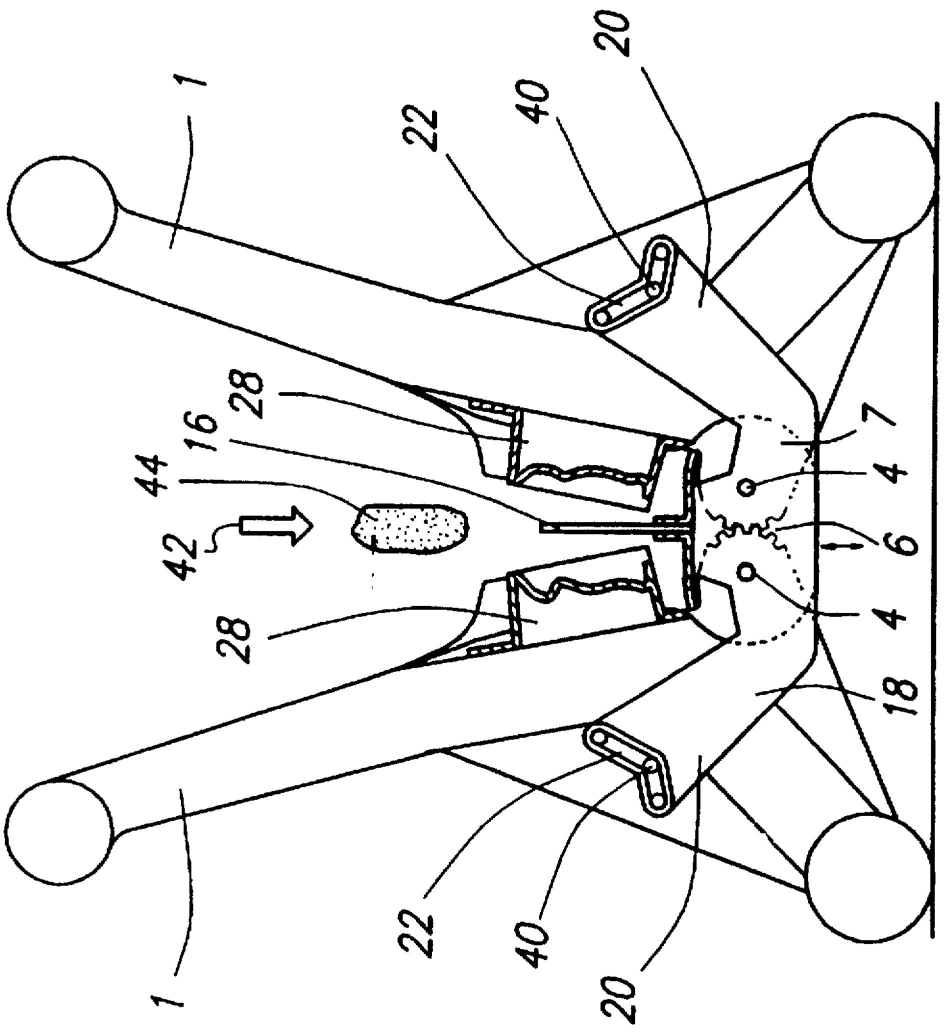
FIG. 3 illustrates a part sectional elevation of the apparatus prior to start.

Referring now to FIG. 3 there is shown the apparatus in constructed position prior to start. The mould pieces 28 and static plate 7 are shown in partial section and the safety plates 21 are not shown for the purpose of illustration of the operation of the apparatus.

In the position of FIG. 3 the levers 1 are in an intermediate position and at this point pins or protrusions 40 (here illustrated in block) on the levers 1 are engaged in intermediate positions in the paths 22 on the arms 20 of the retractor plate 18. The retractor plate fits into vertical slots formed in the base of each of the levers. At this position the location member 16, which is connected to the retractor plate 18, is provided in an upwardly extending position as shown. As well as being in engagement with the retractor plate the levers are in mutual contact via the outer edges 6 of the levers which are meshed thus ensuring that both levers move toward and from a vertical axis 42 between the pivotal axes 4.4 ' at the same speed and to the same extent.

Figure 4:
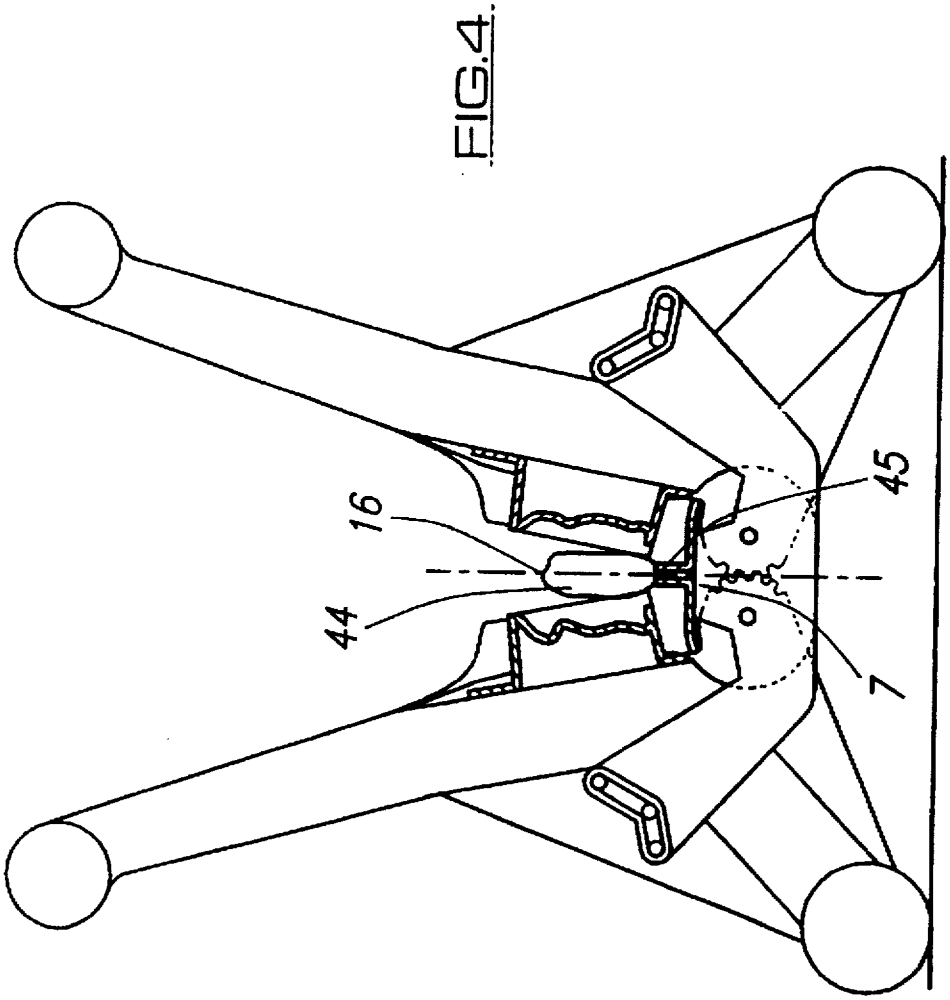
FIG. 4 illustrates a part sectional elevation of the apparatus in a start position.

In this position the mould pieces 28 are placed in position on the levers and a portion of malleable material 44 to be formed is placed onto the location member 16 to a position as shown in FIG. 4 wherein the location member passes through the malleable material 44 with the material pressed down the location member to the pedestal 45 on the static plate 7.

Figure 5:
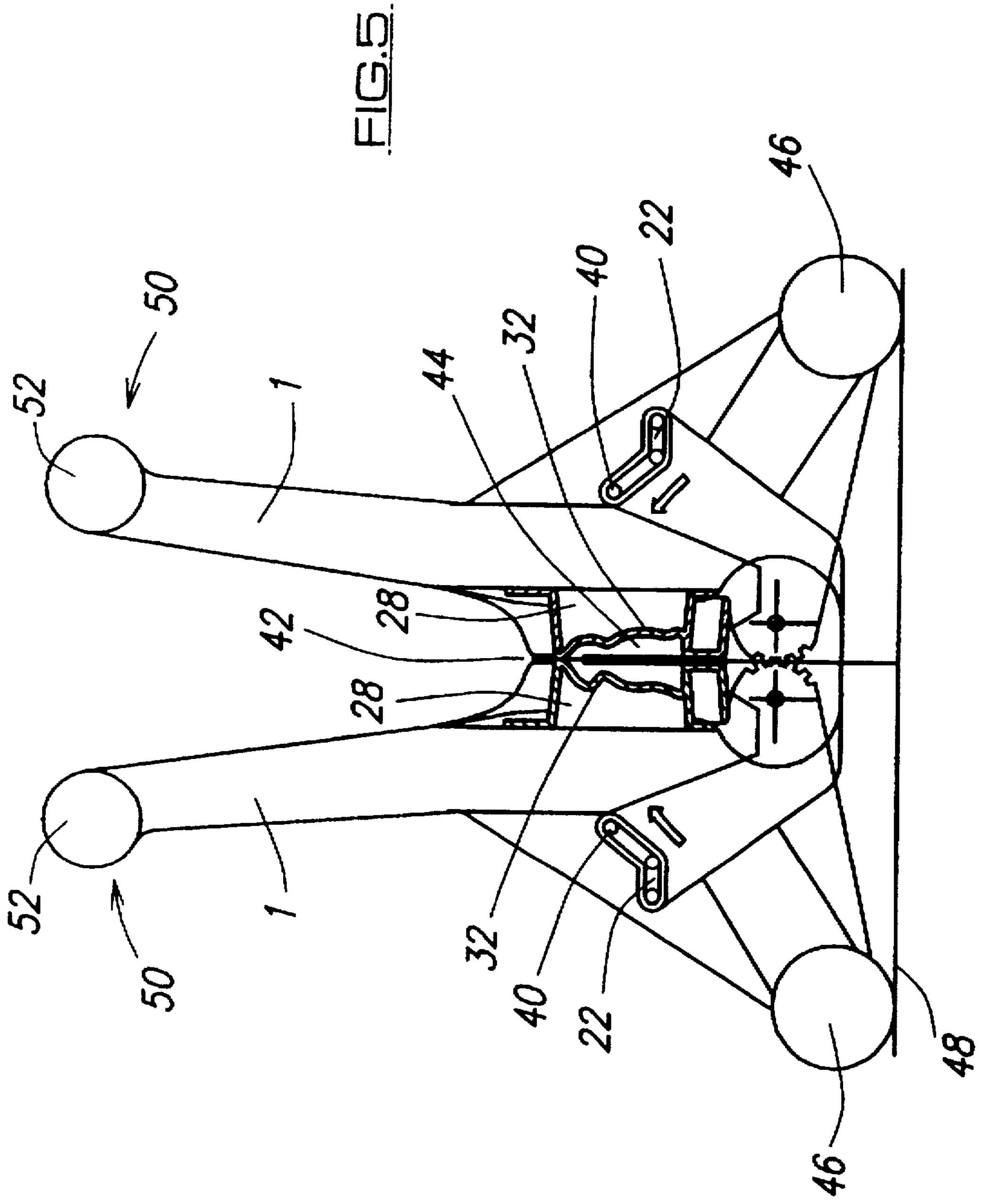
FIG. 5 illustrates a part sectional elevation of the apparatus in a material forming position.

With the base portions 46 of the levers in contact with a firm surface 48 as shown in FIG. 5 the levers are moved toward each other and the vertical axis 42 by exerting a force as shown by the arrows 50 and a smaller downward force on the handle portions 52 of the levers 1. This movement causes the location means on the mould pieces 28 to be brought into engagement and the malleable material 44 to be pressed between the moulds 32. This movement also causes the pins or protrusions 40 on the levers 1 to move to the inner ends of the paths 22 on the retractor plate 18 but this movement does not affect the position of the location member 16 which remains in an extended position during the pressing operation.

Once sufficient pressing force has been exerted on the material 44 the lever arms are moved apart by pulling the same on the handle portions 52 and at the instant of pulling the levers apart to a position as shown in FIG. 4 the location member 16 remains in the extended position. This ensures that as the mould pieces are both simultaneously moved away from the shaped article now formed from the malleable material, the article is maintained in position on the location member thus preventing the same from being retained in either one of the moulds 32 or having to be removed from the same by using fingers or other implements.

Thus the shape of the article remains intact and no damage is caused by the need to remove the same as it is located and supported on the location member 16 and this causes the extraction from the mould pieces as the same are moved apart.

Figure 6:
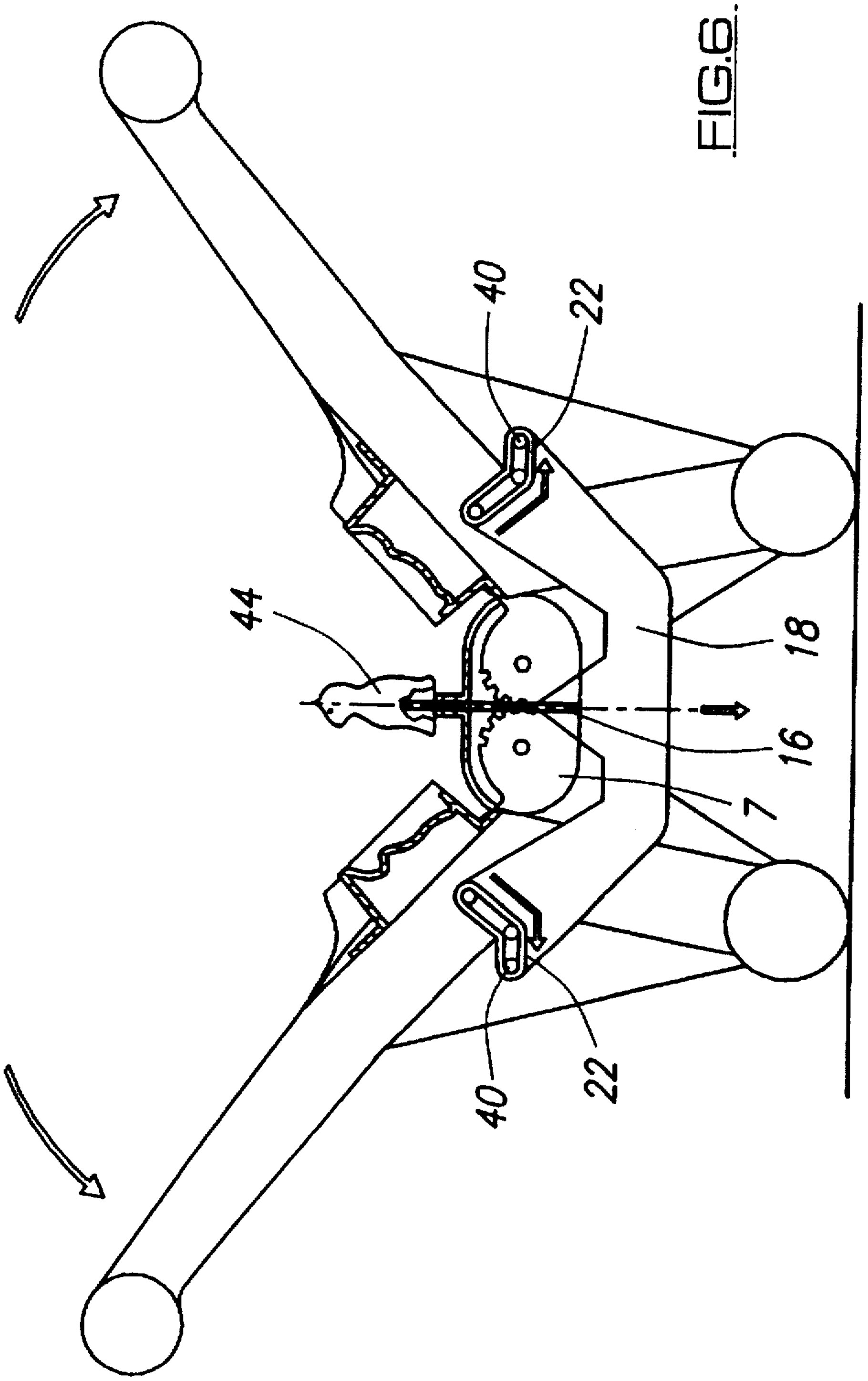
FIG. 6 illustrates a part sectional elevation of the apparatus with the malleable material formed into a shaped article ready for removal.
Figure 7:
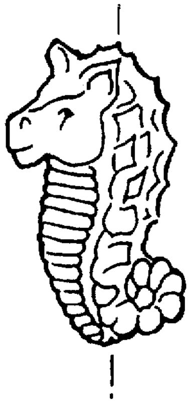
FIG. 7 illustrates a perspective view of a shaped article formed using the apparatus of the invention.
Figure 8:
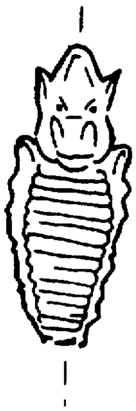
FIG. 8 is a front view of the article of FIG. 7.
Figure 9:
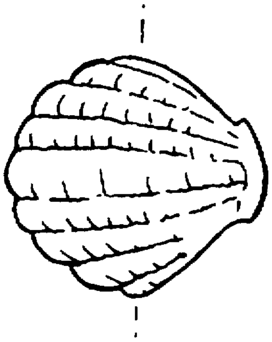
FIG. 9 is a front view of a second shaped article formed using the apparatus of the invention.
Figure 10:
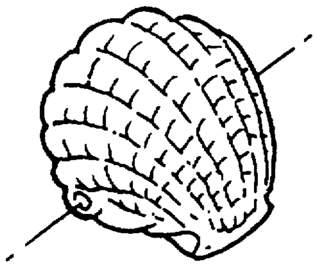
FIG. 10 is a perspective view of the article of FIG. 9.
Figure 11:
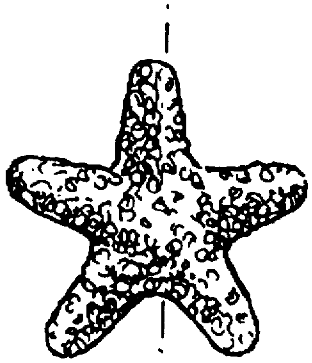
FIG. 11 is a front view of a third shaped article formed using the apparatus of the invention.
Figure 12:
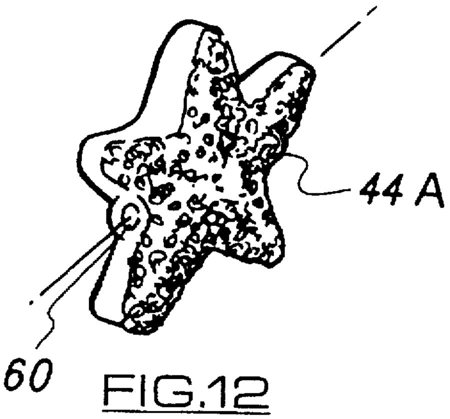
FIG. 12 is a perspective view of the article of FIG. 11.

With the levers moved apart to the position of FIG. 4, continued movement apart of the levers to a position as shown in FIG. 6 causes the pins or protrusions 40 on the same to travel to the outer end of the paths 22 on the retractor plate. The movement of the pins 40 from the intermediate position to the outer end of the paths 22 as shown in FIG. 6 causes relative movement between the static plate 7 and the retractor plate 18 which has the effect of gradually moving the location member 16 to a retracted position in the static plate 7. In this position the location member is at least substantially retracted from the shaped article 44 and at this point the shaped article can be carefully removed by hand and, if necessary, placed in an oven for baking with no or minimal damage being caused to the article.

In one embodiment a release agent can be coated onto the mould pieces prior to contact with the malleable material thereby further ensuring that the malleable material is not retained by the mould pieces when the same are moved apart.

Once this has been done the levers are returned to the position shown in FIG. 3 for the forming of more material or the mould pieces can be removed and replaced with a new set of mould pieces to form a differently shaped article.

FIGS. 7-12 illustrate various articles which have been shaped using the apparatus of the invention. The article 44A clearly illustrates that the aperture 60 formed by the location member 16 can pass through the article but still have a minimal impact on the appearance of the article.

The provision of a location member which serves to locate, support and cause the extraction of the malleable material from the mould pieces when the mould pieces are removed from the material ensures that the shaped formed is maintained in an unblemished condition and thus provides apparatus which can be used to form shaped articles from malleable material with a minimum of handling required and thereby minimising the damage to.the article.

I claim:

1. Apparatus for use to form a malleable material into a shaped article, said apparatus including at least two mould pieces positioned on a mechanical arrangement which is actuable by hand to move the mould pieces into a position to contact with and form malleable material into the shaped article defined by the mould pieces, and apart to release, and allow removal of, the shaped article, said apparatus includes a member to locate said malleable material in the form of the shaped article in a fixed position at least at the instant of moving the mould pieces apart and wherein said locating member is movable between a position where said member passes substantially into the malleable material and a position where substantially all of the member is retracted from the malleable material.

2. Apparatus according to claim 1 wherein the location member passes into the malleable material to form a blind port therein.

3. Apparatus according to claim 1 wherein -the location member passes through the malleable material to form a channel therethrough.

4. Apparatus according to claim 3 wherein the channel is formed in the shaped article to run parallel with the plane of the forming faces of the mould pieces which form the malleable material to minimise the impact on the physical appearance of the shaped article.

5. Apparatus according to claim 1 wherein the malleable material is pressed down onto the location member prior to actuating the mechanical arrangement to bring the mould pieces into contact with the malleable material.

6. Apparatus according to claim 1 wherein the location member is maintained in a fixed position relative to the mould pieces as they are moved.

7. Apparatus for use to form a malleable material into a shaped article, said apparatus including at least two mould pieces positioned on a mechanical arrangement which is actuable by hand to move the mould pieces into a position to contact with and form malleable material into the shaped article defined by the mould pieces, and apart to release, and allow removal of, the shaped article, and wherein the apparatus includes a member to locate said malleable material in the form of the shaped article in a fixed position at least at the instant of moving the mould pieces apart and said member passes at least partially into the malleable material and wherein the location member is movable as the mould pieces are moved, between a position where substantially all of the member is within the malleable material, and a position where substantially all of the member is retracted from the malleable material.

8. Apparatus according to claim 7 wherein the location member is retracted from the malleable material once the mould pieces have moved away from the malleable material such that the shaped article which is formed from the malleable material can be removed from the apparatus.

9. Apparatus according to claim 7 wherein the location member is maintained in a satisfactory position while the mould pieces are moved from the malleable material to an intermediate, apart position and continued movement of the mould pieces causes the member to move to retract from the malleable material.

10. Apparatus according to claim 1 wherein the mechanical arrangement comprises two levers having two lever pivot points with said levers mounted to be pivotally movable towards and from a common plane intermediate the two lever pivot points.

11. Apparatus according to claim 10 wherein the levers are mechanically connected by means of meshed teeth to be movable in a synchronised manner towards and away from the said plane.

12. Apparatus according to claim 10 wherein each lever is provided with a support surface contact which is brought into contact with a support surface and allows hand actuation of at least one other part of each of the levers to move and mould pieces towards and away from each other.

13. Apparatus according to claim 10 wherein each lever is provided with releasable engagement means for the location of at least one mould piece therein.

14. Apparatus according to claim 13 wherein each of said engagement means is arranged at the same relative position on each lever to ensure that the mould pieces are brought together in register to form the malleable material into a shaped article.

15. Apparatus for use to form a malleable material into a shaped article, said apparatus including at least two mould pieces positioned on a mechanical arrangement which is actuable by hand to move the mould pieces into a position to contact with and form malleable material into the shaped article defined by the mould pieces, and apart to release, and allow removal of, the shaped article, and wherein the apparatus includes a member to locate said malleable material in the form of the shaped article in a fixed position at least at the instant of moving the mould pieces apart and said member passes at least partially into the malleable material and wherein a third mould piece is provided on the mechanical arrangement in a fixed position relative to the first and second mould pieces.

16. Apparatus according to claim 10 wherein the location member is located to lie along the common plane intermediate the two lever pivot points.

17. Apparatus for use to form a malleable material into a shaped article, said apparatus including at least two mould pieces positioned on a mechanical arrangement which is actuable by hand to move the mould pieces into a position to contact with and form malleable material into the shaped article defined by the mould pieces, and apart to release, and allow removal of, the shaped article, and wherein the apparatus includes a member to locate said malleable material in the form of the shaped article in a fixed position at least at the instant of moving the mould pieces apart and said member passes at least partially into the malleable material and wherein at least one of the mould pieces consists of a base plate, and depending upwardly from said base plate, a forming portion into which the malleable material is pressed to form at least part of the shaped article.

* * * * *